E. F. SEBESTA.
MOUSE OR RAT TRAP.
APPLICATION FILED JAN. 30, 1913.
1,077,098.
Patented Oct. 28, 1913.
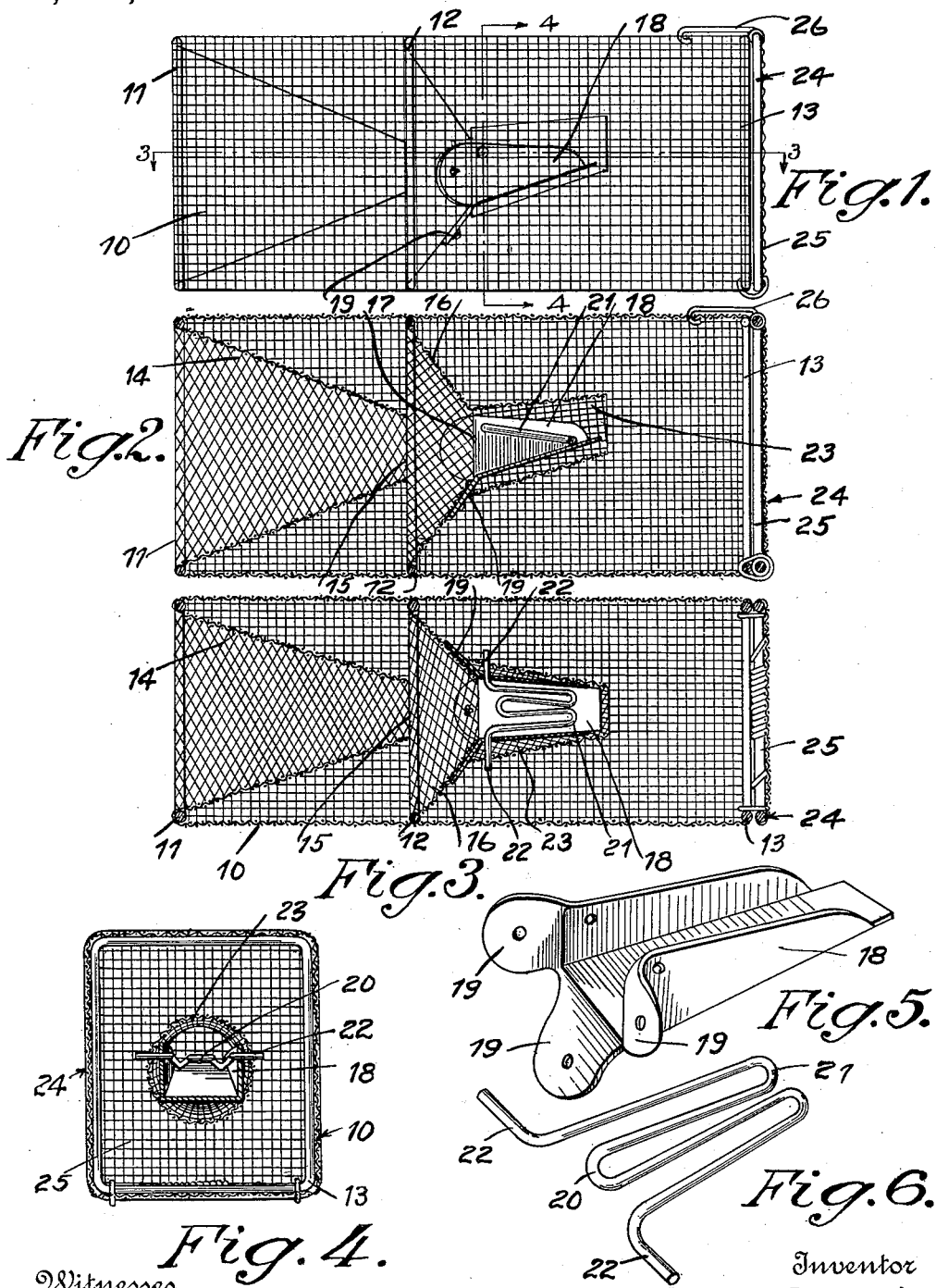

UNITED STATES PATENT OFFICE.

EDWARD F. SEBESTA, OF ERIN TOWNSHIP, RICE COUNTY, MINNESOTA.

MOUSE OR RAT TRAP.

1,077,098.  Specification of Letters Patent.  Patented Oct. 28, 1913.

Application filed January 30, 1913. Serial No. 745,241.

*To all whom it may concern:*

Be it known that I, EDWARD F. SEBESTA, a citizen of the United States, residing in Erin township, in the county of Rice, State of Minnesota, have invented certain new and useful Improvements in Mouse or Rat Traps; and I do hereby declare the following to be a full, clear, and exact description of the invention, such as will enable others skilled in the art to which it appertains to make and use the same.

This invention relates to novel and useful improvements in animal traps and more particularly to mouse or rat traps.

The essential object of the invention is evolved in the provision of a trap of the self-set and ever-set class, embodying an improved arrangement of entrance openings and a gate designed to permit the entrance of the mouse or rat but to prevent its escape, the parts being mounted in a foraminous casing and designed to simplify and cheapen the structure.

With the above and other objects in view, the invention resides more particularly in the peculiar combinations and arrangements of parts which will be partly illustrated as a preferred embodiment in the accompanying drawings and described in the specification, although the invention is protected for all desirable changes and uses within the scope of the invention as claimed.

Figure 1 is a side elevation of a trap constructed in accordance with the invention, the parts being in set position. Fig. 2 is a longitudinal sectional view thereof taken vertically. Fig. 3 is a horizontal sectional view taken on the line 3—3 of Fig. 1. Fig. 4 is a cross sectional view taken on the line 4—4 of Fig. 1. Fig. 5 is a detail perspective view of a chute employed at one of the ingress openings. Fig. 6 is a detail perspective view of a gate adapted to be carried by the chute.

In illustrating the preferred embodiment of the invention, the improved trap is shown as embodying a foraminous casing 10 preferably of wire mesh and substantially oblong in form. The casing is provided at its entrance end with a reinforcing frame 11, centrally with a frame 12 and at the outlet end with a frame 13. A substantially frusto-conical entrance member 14 is provided at the entrance end of the casing, being attached to the frame member 11 with the casing and having an exit opening 15 at its apex spaced above the bottom of the casing. A partition or guard cone 16 is mounted between the frame 12 being only slightly lowered toward the discharge end and having an egress opening 17 at its apex, such partition or guard cone 16 forming a compartment with the entrance member 14 whereby the animals if they escape into said compartment will find it difficult to make their exit. A sheet metal chute 18 is disposed to receive the animals from the egress opening 17 and consists of a section of sheet metal having a plurality of ears 19 at its base portion, preferably apertured and projecting toward the sides and bottom of the casing and secured to the partition or guard cone 16 so that the animals may in passing through the exit opening 15, pass on to the chute. A gate 20 is pivoted to the chute, such gate consisting of wire rebent in zigzag form as shown at 21 and having its terminals 22 extended in opposite directions and pivotally mounted in the sides of the chute adjacent the ingress opening so that the gate is normally inclined in an opposite direction to the direction of inclination of the bottom of the chute, to normally close the ingress opening, the free end of the gate resting upon the chute. A foraminous guard 23 circumscribes the chute and is attached to the partition or guard cone 16, the wires forming the fabric of the guard cone engaging through the foramina of said guard and the guard being open at its ends. A closure 24 is connected to the outlet frame 13 and consists of a wire frame 25 covered with mesh and provided with a catch 26 for holding it in a closed position. It will thus appear that a mouse or rat entering the entrance member 14 will approach the ingress opening of the partition or guard cone 16, with or without bait in the compartment between the partition or guard cone and the closure and by passing on to the chute, the gate will be raised and the animals discharged into the trap at the small end of the guard surrounding the chute. The gate will then drop to a closed position and any attempt to open it will result in the bearing of the animal's weight thereon so that the escape of the animal is not permitted.

It will be noted that by the provision of the guard cone a space is left between the inner end of the entrance member 14 and the inner end of the guard so that the animal entering the trap has to make a small jump.

Furthermore when the animal is once in the portion 23, having jumped there if he endeavors to back out the steep sides of the guard cone cause him to feel that he is dropping down and urge him forward so that he is prevented from backing out. Furthermore, it will be observed that by the provision of the guard 23 the animal is kept from lifting the gate from the top since he cannot get at said gate from the upper side thereof.

I claim:—

1. A rat trap comprising a foraminous casing having an entrance end with an ingress opening at its apex, a guard cone spaced from entrance member and a sheet metal chute disposed to receive from the last mentioned ingress opening and having ears at its base secured to the end of the guard cone, a gate pivoted to the sides of the chute adjacent the ingress opening and resting with its opposite end within the chute and a foraminous guard circumscribing the chute and open at both ends.

2. A rat trap comprising a foraminous casing having an entrance member with an ingress opening at its apex, a guard cone spaced from entrance member and a sheet metal chute disposed to receive from the last mentioned ingress opening and having ears at its base secured to the end of the guard cone, a gate consisting of a rebent wire disposed within the chute and having its terminals extended in opposite directions and pivotally mounted in the sides of the chute adjacent the ingress opening of the guard cone and extending beyond the sides of the chute, the opposite end portion of the gate resting upon the chute, and a foraminous guard circumscribing the chute, the guard being open at its ends.

In testimony whereof, I affix my signature, in the presence of witnesses.

EDWARD F. SEBESTA.

Witnesses:
J. F. MALEK,
THOMAS SEBESTA,
D. A. HANLON.

---

Copies of this patent may be obtained for five cents each, by addressing the "Commissioner of Patents, Washington, D. C."